United States Patent
Hagiwara

(10) Patent No.: US 9,384,432 B2
(45) Date of Patent: Jul. 5, 2016

(54) IMAGE FORMING APPARATUS, METHOD FOR CONTROLLING IMAGE FORMING APPARATUS, AND STORAGE MEDIUM THAT SUPPLY POWER TO A SPECIFIC DEVICE IN A STATE IN WHICH AN ERROR IS OCCURRING IN THE SPECIFIC DEVICE

(71) Applicant: CANON KABUSHIKI KAISHA, Tokyo (JP)

(72) Inventor: Yuichi Hagiwara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/622,437

(22) Filed: Feb. 13, 2015

(65) Prior Publication Data
US 2015/0235115 A1 Aug. 20, 2015

(30) Foreign Application Priority Data
Feb. 18, 2014 (JP) ................................ 2014-028392

(51) Int. Cl.
*G06K 15/00* (2006.01)
*H04N 1/00* (2006.01)
*G03G 15/00* (2006.01)
*G06F 3/12* (2006.01)

(52) U.S. Cl.
CPC ........ *G06K 15/4055* (2013.01); *G03G 15/5004* (2013.01); *G03G 15/55* (2013.01); *G06K 15/408* (2013.01); *H04N 1/00* (2013.01)

(58) Field of Classification Search
CPC .................................................. G06K 15/4055
USPC ............................................. 358/1.13, 1.14
See application file for complete search history.

(56) References Cited

U.S. PATENT DOCUMENTS

| 5,832,331 | A | * | 11/1998 | Yoshida | G03G 15/5012 358/401 |
| 7,664,904 | B2 | * | 2/2010 | Oshikiri | G06F 13/4022 370/229 |
| 2006/0017987 | A1 | * | 1/2006 | Chen | H04N 1/00551 358/474 |
| 2007/0109586 | A1 | * | 5/2007 | Yamada | G06F 3/121 358/1.14 |
| 2008/0114996 | A1 | * | 5/2008 | Suzuki | G03G 15/5004 713/320 |

FOREIGN PATENT DOCUMENTS

JP 2003241582 A * 8/2003
JP 2008122917 A 5/2008

OTHER PUBLICATIONS

JP2003-241582 translation.*

* cited by examiner

*Primary Examiner* — Dov Popovici
(74) *Attorney, Agent, or Firm* — Canon USA, INC., IP Division

(57) ABSTRACT

An image forming apparatus that shifts to a power saving state includes a detection unit that detects an abnormality occurring in a device of the apparatus, a storage unit that stores, when the apparatus is to shift to the power saving state, information indicating the detected abnormality, a reception unit that receives a request to wake up from the power saving state, a determination unit that determines, when the reception unit has received the request, whether the device identified by the stored information is to be used, a control unit that performs control to supply power to the detection unit if the determination unit determines that the device is not to be used, and a display unit that displays information on the abnormality.

12 Claims, 17 Drawing Sheets

FIG.7

| | PRESS OF KEY UNIT | DETECTION OF HUMAN BODY | DETECTION OF DOCUMENT | RECEPTION OF PRINT JOB |
|---|---|---|---|---|
| TURN IMAGE READING UNIT ON | × | × | ○ | × |
| TURN IMAGE FORMING UNIT ON | × | × | × | ○ |
| PERFORM DISPLAY ON DISPLAY UNIT | ○ | ○ | ○ | × |

IMAGE FORMING APPARATUS, METHOD FOR CONTROLLING IMAGE FORMING APPARATUS, AND STORAGE MEDIUM THAT SUPPLY POWER TO A SPECIFIC DEVICE IN A STATE IN WHICH AN ERROR IS OCCURRING IN THE SPECIFIC DEVICE

BACKGROUND

1. Field

Aspects of the present invention generally relate to an image forming apparatus, a method for controlling the image forming apparatus, and a storage medium.

2. Description of the Related Art

In recent years, with an increase in environmental consciousness, an image forming apparatus such as a copying machine has performed a function of shifting to a sleep mode to save power if the apparatus has not been used for a predetermined time or if a user has issued an instruction for shifting to a low power consumption state (sleep mode). For example, in the sleep mode, power supply to a printer unit or a scanner unit is stopped in order to achieve power saving while maintaining the convenience of the user as much as possible.

Further, there is an image forming apparatus which includes, in addition to a main central processing unit (CPU) for controlling each unit of the apparatus, a sub CPU having lower performance than that of the main CPU. When an error has occurred in the apparatus, power supply to the main CPU is stopped and only the sub CPU is caused to operate, so that the apparatus shifts to the sleep mode and power consumption is reduced (refer to Japanese Patent Application Laid-Open No. 2008-122917).

Furthermore, there is a technique in which, when an image forming apparatus wakes up from the sleep mode, only a part of the apparatus is initialized according to the content of an operation request serving as a wake-up trigger (refer to Japanese Patent Application Laid-Open No. 2003-241582). For example, if a print request is received in the sleep mode, the printer unit is initialized and the scanner unit is not initialized. In other words, if a print request is received, power is supplied to the printer unit and not to the scanner unit. Thus, in the technique discussed in Japanese Patent Application Laid-Open No. 2003-241582, when a request is received in the sleep mode, power is supplied only to a minimum portion necessary for responding to the request. As a result, power saving, prevention of noise, and an increase in the longevity of the apparatus are realized.

However, according to the above-described conventional techniques, if the apparatus shifts to the sleep mode while in a state where an error such as a paper jam has occurred and then receives a wake-up request which does not require the activation of the portion in which the paper jam has occurred, that portion is not initialized. Thus, there is a problem that power is not supplied to the portion in which the paper jam has occurred and the apparatus is unable to notify an operator of the paper jam error immediately after the apparatus wakes up from the sleep mode.

Further, in recent years, there has been an image forming apparatus including a human body detection sensor which allows the apparatus to wake up from the sleep mode more easily. With only an operator coming near the apparatus, the apparatus can wake up from the sleep mode. When such an apparatus wakes up from the sleep mode according to the human body detection serving as a trigger, the apparatus often does not supply power to the printer unit or the scanner unit so as to reduce power consumption as much as possible, similarly to the above-described apparatus. As a result, only waking up from the sleep mode does not allow the operator to notice that the paper jam has occurred. The operator notices that such an error has occurred, only after executing a job such as a copy function which uses the portion in which the error has occurred, so that the above-described problem is more apparent.

SUMMARY

Aspects of the present invention are generally directed to a technique for displaying information on an abnormality that has occurred in an image forming apparatus before the apparatus shifts to a sleep state and that corresponds to a function not to be selected when the apparatus wakes up from the sleep mode, without performing initialization.

According to an aspect of the present invention, an image forming apparatus that shifts to a power saving state includes a detection unit configured to detect an abnormality that occurs in a device of the image forming apparatus, a storage unit configured to store, when the image forming apparatus is to shift to the power saving state, information indicating the abnormality, a reception unit configured to receive a request to wake up from the power saving state, a determination unit configured to determine, when the reception unit has received the request, whether the device identified by the information stored in the storage unit is to be used, a control unit configured to perform control to supply power to the detection unit if the determination unit determines that the device is not to be used, and a display unit configured to display information on the abnormality.

Further features of the present disclosure will become apparent from the following description of exemplary embodiments with reference to the attached drawings.

BRIEF DESCRIPTION OF THE DRAWINGS

FIG. 7 illustrates a power supply state for each sleep mode wake-up trigger.

DESCRIPTION OF THE EMBODIMENTS

Various exemplary embodiments will be described in detail below with reference to the drawings. Components described according to the exemplary embodiments are only examples and do not limit the scope of the present disclosure.
<System Configuration>

Figure 1:
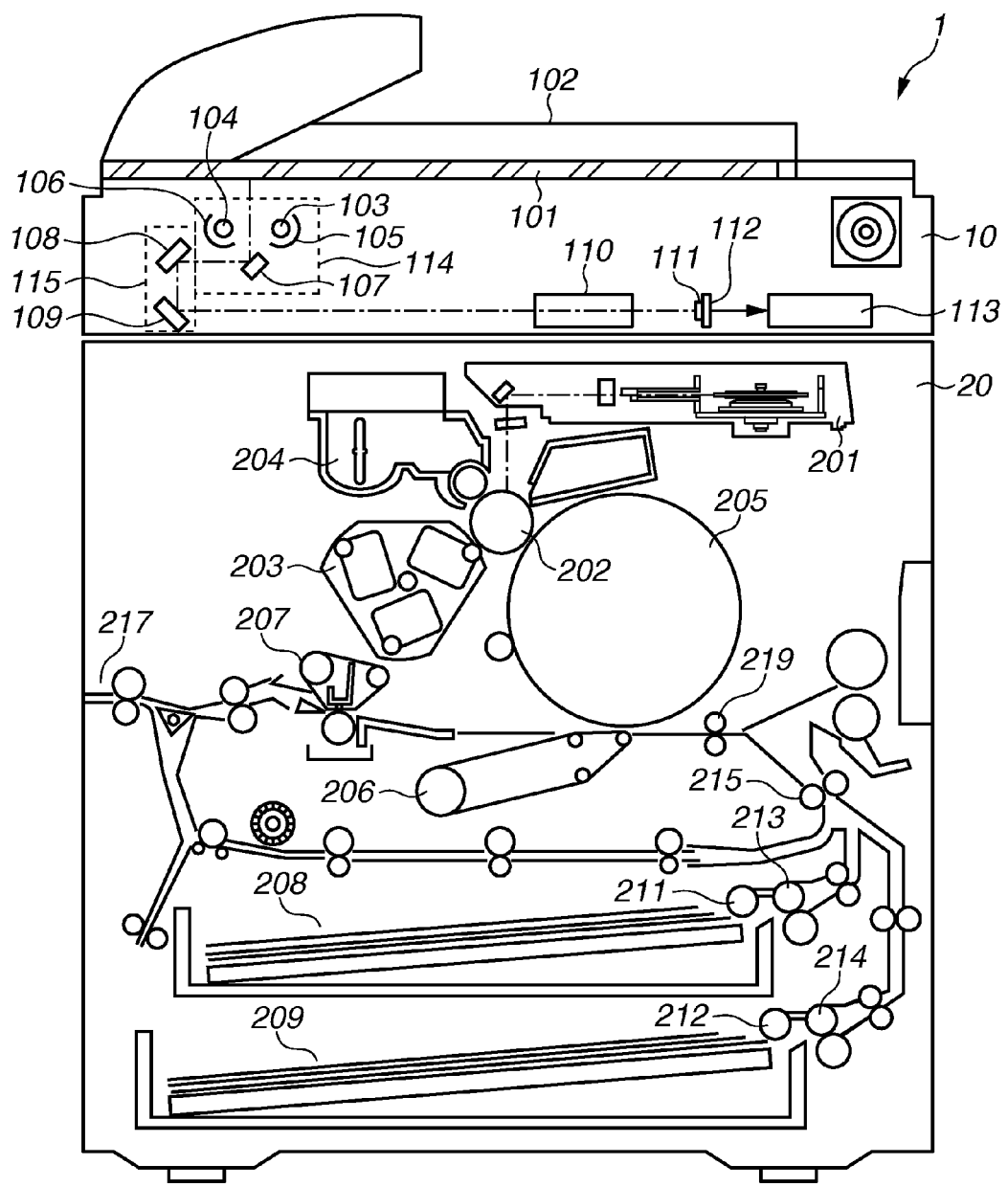
FIG. 1 is a cross-sectional view illustrating a configuration of an image forming apparatus.

FIG. 1 is a cross-sectional view illustrating the configuration of an image forming apparatus 1 according to a first exemplary embodiment. The image forming apparatus 1 according to the present exemplary embodiment includes a scanner unit 10 serving as an image input device, and a printer unit 20 serving as an image output device. According to the present exemplary embodiment, the image forming apparatus 1 is configured to be capable of realizing power supply control (described in detail below) which allows the power supply state of a power supply unit to shift to a second power state (sleep state) having lower power consumption than that of a first power state.

The scanner unit 10 includes a document positioning plate 101 and an automatic document feeder 102. A mirror surface pressing plate or a white pressing plate (not illustrated) may be attached instead of the automatic document feeder 102. Light sources 103 and 104 such as a halogen lamp, a fluorescent lamp, or a xenon lamp illuminate a document.

Reflectors 105 and 106 converge light from the light sources 103 and 104 on the document, respectively. Further, the scanner unit 10 includes mirrors 107, 108, and 109, a charge-coupled device (CCD) image sensor (hereinafter referred to as CCD) 111, and a lens 110 which converges light reflected or projected from the document on the CCD 111.

Furthermore, the scanner unit 10 includes a substrate 112 on which the CCD 111 is mounted, a reader scanner control unit 113, a carriage 114 containing the light sources 103 and 104, the reflectors 105 and 106, and the mirror 107, and a carriage 115 containing the mirrors 108 and 109. The carriages 114 and 115 mechanically move in a sub scanning direction Y perpendicular to an electrical scanning direction (i.e., a main scanning direction X) of the CCD 111, so as to scan an entire surface of the document.

Next, the configuration of the printer unit 20 will be described below.

The printer unit 20 includes a laser scanner 201 which scans and irradiates a photosensitive drum 202 with a laser beam corresponding to an image data signal in the main scanning direction using a polygon mirror. The photosensitive drum 202 rotates in an anti-clockwise direction, so that an electrostatic latent image formed on the photosensitive drum 202 reaches a sleeve position of a color developing unit 203 or a black developing unit 204. The color developing unit 203 and the black developing unit 204 supply the amount of toner corresponding to the charge on the photosensitive drum 202, and develop the electrostatic latent image formed on the photosensitive drum 202.

When a monochrome image is to be developed, only the black developing unit 204 is used and an image forming speed is switched to be higher, and each motor and each bias value are switched accordingly. When a full color image is to be developed, both the color developing unit 203 and the black developing unit 204 are used and operate at a normal image forming speed.

The photosensitive drum 202 rotates in the anti-clockwise direction, so that a toner image formed on the photosensitive drum 202 is transferred onto an intermediate transfer unit 205 rotating in a clockwise direction. The transfer onto the intermediate transfer unit 205 is completed when the intermediate transfer unit 205 rotates once in the case of the monochrome image and rotates four times in the case of the full color image.

A recording sheet is picked up from an upper-stage cassette 208 by a pick-up roller 211 or from a lower-stage cassette 209 by a pick-up roller 212, conveyed by a sheet feed roller 213 or a sheet feed roller 214, and then conveyed by a conveyance roller 215 up to a registration roller 219. The recording sheet is then conveyed to a portion between the intermediate transfer unit 205 and a transfer belt 206 at a timing when the transfer onto the intermediate transfer unit 205 is completed.

The recording sheet is further conveyed by the transfer belt 206 and brought into press contact with the intermediate transfer unit 205, so that the toner image formed on the intermediate transfer unit 205 is transferred onto the recording sheet. The toner image transferred on the recording sheet is heat-pressed by a fixing roller and a pressing roller 207 and is thus fixed on the recording sheet. The recording sheet on which the image is fixed is discharged to a face-up discharge port 217.

Residual toner, which has not been transferred onto the recording sheet and remains on the intermediate transfer unit 205, is cleaned in post-processing control performed at a latter half of an image forming sequence. In the post-processing control, a cleaning R (not illustrated) charges, as waste toner, the residual toner on the intermediate transfer unit 205 after the transfer onto the recording sheet, to polarity opposite to the original polarity of the toner. The residual toner of the opposite polarity is then retransferred onto the photosensitive drum 202.

In a photosensitive drum unit, the residual toner of the opposite polarity is scraped off from the drum surface by a blade (not illustrated) and conveyed to a waste toner box integrated inside the photosensitive drum unit. The residual toner on the intermediate transfer unit 205 is thus completely removed, and the post-processing control ends. The above-described image forming operation is performed by a main control unit (described below) and a controller including an image processing unit (described below).

Figure 2:
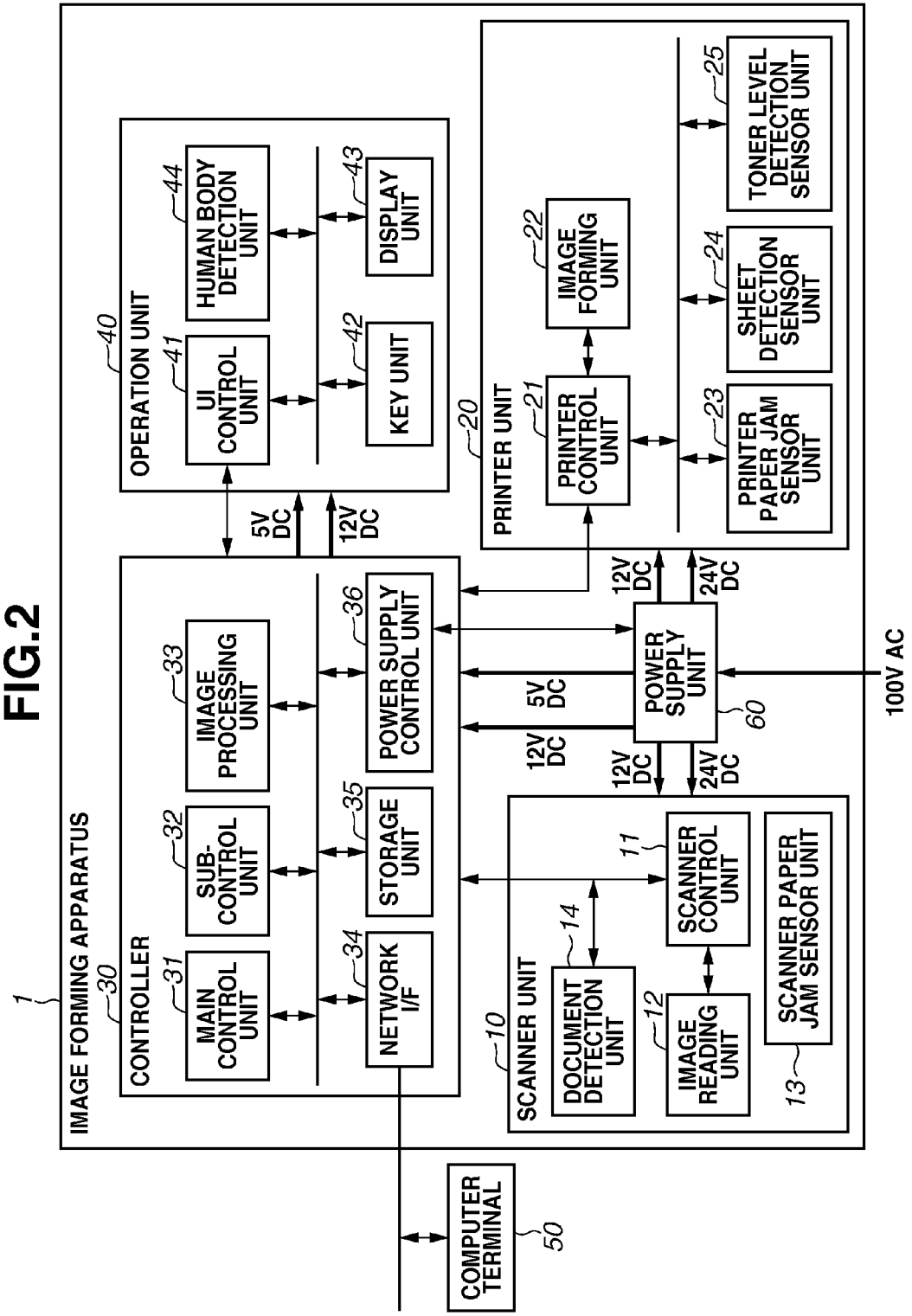
FIG. 2 is a block diagram illustrating a power supply system of the image forming apparatus.

FIG. 2 is a block diagram illustrating a power supply system of the image forming apparatus 1 according to the present exemplary embodiment. According to the present exemplary embodiment, the image forming apparatus 1 includes a power supply unit 60 which controls power supply to each functional processing unit in the image forming apparatus 1.

Referring to FIG. 2, the image forming apparatus 1 is large and includes a controller 30 which controls image processing and an image forming operation, and an operation unit 40 which inputs and outputs information between the image forming apparatus 1 and a user. Further, the image forming apparatus 1 includes the scanner unit 10 serving as an image input device and the printer unit 20 serving as an image output device, which have been described with reference to FIG. 1.

In the controller 30, a main control unit 31 controls the entire operation of the image forming apparatus 1. The main control unit 31 includes a CPU (not illustrated) and peripheral devices (not illustrated) such as a read-only memory (ROM) storing programs which define the operations of the CPU and a random access memory (RAM) which functions as a work memory for temporarily storing data used in calculations or a work area.

A sub control unit 32 includes a CPU (not illustrated) and storage units (not illustrated) such as a ROM storing the programs which define the operations of the CPU and a RAM which temporarily stores data. A circuit size of the sub control unit 32 is smaller than that of the main control unit 31, and the sub control unit 32 is configured to be capable of communicating with the main control unit 31. The sub control unit 32 mainly performs the processing that is required when the image forming apparatus 1 is set to a sleep mode (described below).

An image processing unit 33 converts an analog image, which is read by the scanner unit 10 according to an instruction from the operation unit 40, into a digital image and performs image processing and compression on the digital image. Further, when file data (a compressed image) to be printed out, which is received from a computer terminal 50 on a local area network via a network interface (I/F) 34, is written to a storage unit 35, the image processing unit 33 decompresses the compressed file data, performs image processing according to the output state, and for example, in the case of laser exposure, performs analog modulation into a laser signal. Based on the analog-modulated signal, the printer unit 20 prints out the data.

A power supply control unit 36 transmits an on/off control signal for controlling the power supply unit 60 based on the control performed by the main control unit 31 or the sub control unit 32, and switches a power state to a standby mode or a sleep mode, for example.

In the scanner unit 10, a scanner control unit 11 receives an instruction from the controller 30, and controls the operation of each unit that is necessary for the operation of an image reading unit 12, as described with reference to FIG. 1. Similarly, a printer control unit 21 controls the operation of each unit that is necessary for the operation of an image forming unit 22, as described with reference to FIG. 1.

A scanner paper jam sensor unit 13 and a printer paper jam sensor unit 23 include a plurality of jam sensors each of which is arranged at an appropriate location for detecting a paper jam on a document conveyance path in the automatic document feeder 102 or in each of conveyance paths. In the image forming apparatus 1, when a sheet is conveyed on each of the conveyance paths to perform image formation processing on the sheet, or when post-processing is performed on the sheet having an image formed thereon, the conveyed sheet may become jammed in any of the conveyance paths. Each of the jam sensors described above detects such a paper jam.

A document detection unit 14 is controlled by the sub control unit 32. When the document detection unit 14 detects that a pressing plate has been opened or closed or that a document has been placed, the sub control unit 32 immediately controls the power supply control unit 36 to activate the main control unit 31, so as to shift the image forming apparatus 1 to the standby mode. A sheet detection sensor unit 24 is disposed in the upper-stage cassette 208 and the lower-stage cassette 209, and detects whether there is a sheet in the cassette. A toner level detection sensor unit 25 is disposed in the color developing unit 203 and the black developing unit 204, and detects the amount of developer remaining in a developer container to detect whether the toner has run out.

In the operation unit 40, a user interface (UI) control unit 41 controls the operation unit 40 in response to receiving various operation instructions from the operator or instructions from the main control unit 31. A key unit 42 includes a power saving key for shifting the image forming apparatus 1 to the power saving mode, a start key for allowing the operator to input a print execution instruction, and a numeric keypad for inputting the number of copies to be printed. A display unit 43 displays operation guide information of various copy operations, and includes a liquid crystal display having a touch panel function for inputting various settings. A human body detection unit 44 is a sensor for detecting a human body, such as an infrared sensor or a reflection sensor. While the image forming apparatus 1 is in the power saving mode, the human body detection unit 44 detects that the operator has come near the image forming apparatus 1 and outputs a signal for waking up from the sleep mode.

The power supply unit 60 generates 5V direct current (DC), 12V DC, and 24V DC from a commercial power supply, and supplies 5V DC and 12V DC to the controller 30 and 12V DC and 24V DC to the scanner unit 10 and the printer unit 20.

Further, similarly to the controller 30, the power supply of the operation unit 40 receives 5V DC and 12V DC via the controller 30.

Use of each power will be described below. 5V DC is the power that is constantly supplied even in the sleep mode. 5V DC is thus supplied to the sub control unit 32 which controls the image forming apparatus 1 having shifted to the sleep mode, and to the network I/F 34, the key unit 42, and the human body detection unit 44 for receiving a request to wake up from the sleep mode. 12V DC and 24V DC are the power that is stopped being supplied while the image forming apparatus 1 is in the sleep mode. 24V DC is supplied to a power supply for operating a driving system such as a motor of the image reading unit 12 or the image forming unit 22, and 12V DC is supplied to the other units such as the control units and the sensor units. The document detection unit 14 in the scanner unit 10 receives 5V DC from the controller 30 and is thus capable of operating even in the sleep mode.

A control operation of the image forming apparatus 1 according to the present exemplary embodiment will be described below with reference to the flowchart illustrated in FIG. 3.

Figure 3:
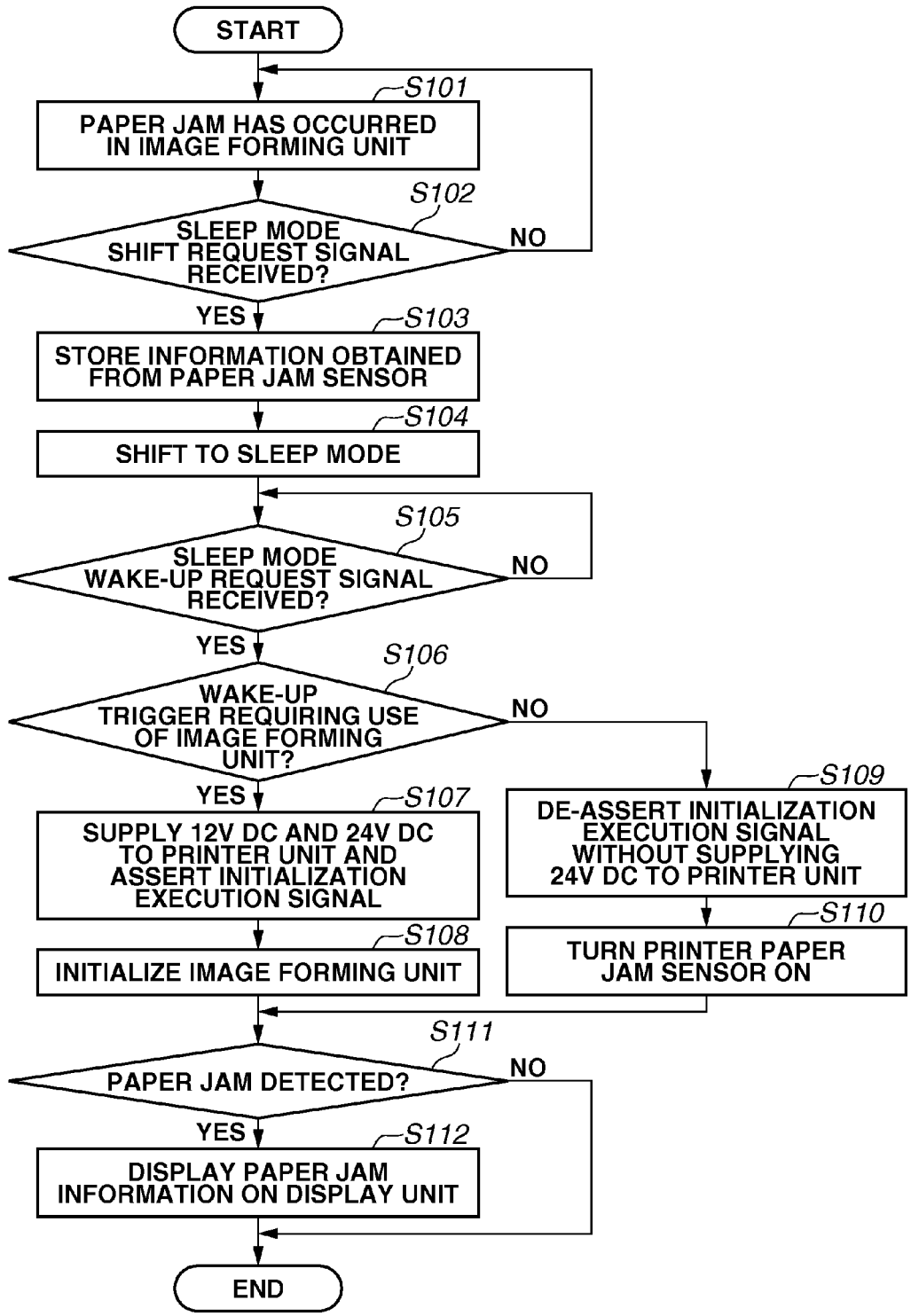
FIG. 3 is a flowchart illustrating a control method of the image forming apparatus.

FIG. 3 is a flowchart illustrating the control method of the image forming apparatus 1 according to the present exemplary embodiment. More specifically, the flowchart illustrates an example of power supply control that is performed when a paper jam has occurred in the image forming unit 22. Each of the steps is realized by executing the control program. According to the present exemplary embodiment, a plurality of sensors is arranged on a predetermined conveyance path in the scanner unit 10 and the printer unit 20 of the image forming apparatus 1, so as to detect jamming (of a document or a sheet used for printing). Further, the black developing unit 204 and the color developing unit 203 illustrated in FIG. 1 include a sensor for detecting the remaining amount of developer for each color. As a result, the main control unit 31 is configured to capable of determining whether a specific abnormality, which may occur due to the operation of a rotational driving system of the printer 20 or the scanner unit 10 according to a received job, has been detected.

Figure 4:
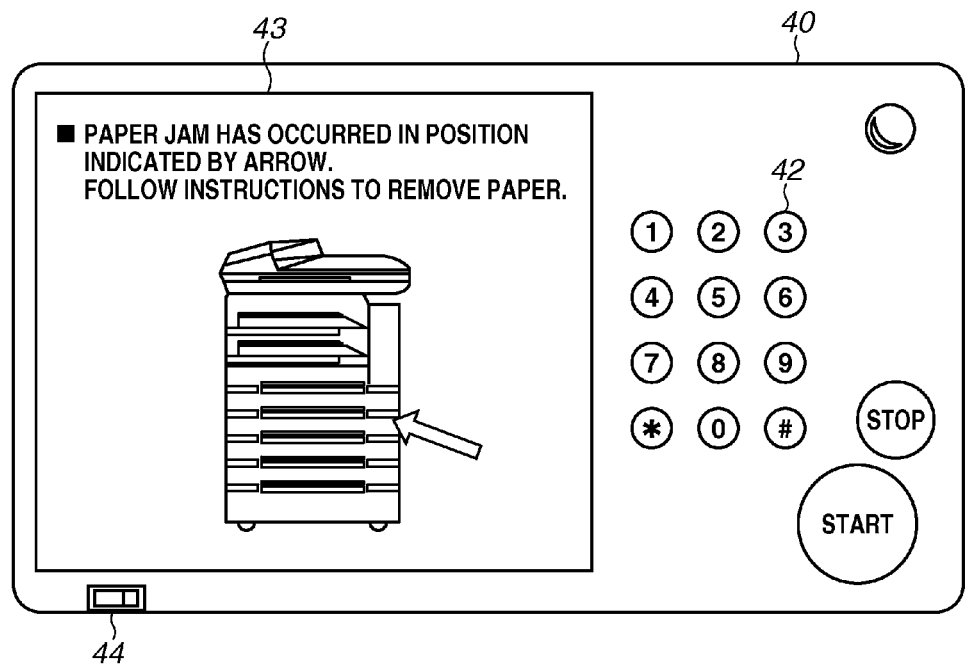
FIG. 4 illustrates an example of a user interface (UI) screen displayed on the image forming apparatus.

First, in step S101, when a paper jam has occurred while the image forming apparatus 1 performs an image forming operation using the image forming unit 22, the printer paper jam sensor unit 23 detects the paper jam. The printer paper jam sensor unit 23 then transmits a paper jam occurrence signal and paper jam position information to the main control unit 31 via the printer control unit 21. Upon receiving the paper jam occurrence signal, the main control unit 31 displays on the display unit 43 an UI screen for warning the occurrence of the paper jam as illustrated in FIG. 4, and stops the image forming operation.

In step S102, the main control unit 31 determines whether the image forming apparatus 1 has been left for a predetermined time in a state where the paper jam has occurred, or has received a sleep mode shift request from the user pressing the key unit 42. If the image forming apparatus 1 has been left for the predetermined time in the paper jam state or has received the sleep mode shift request (YES in step S102), the processing proceeds to step S103. In step S103, the main control unit 31 generates current paper jam state information of the image forming apparatus 1 based on the paper jam information obtained from the printer paper jam sensor unit 23 and the scanner paper jam sensor unit 13, and transmits the generated information to the sub control unit 32. The transmitted paper jam state information (abnormality information) is stored in a storage unit (not illustrated) of the sub control unit 32. Further, if a job has been interrupted due to the paper jam, the main control unit 31 stores information of the job in the storage unit 35. After transmitting the paper jam state information to the sub control unit 32, in step S104, the main control unit 31 controls the power supply control unit 36 to stop outputting 12V DC and 24V DC, so as to shift the image forming apparatus 1 to the sleep mode.

On the other hand, if the jammed sheet has been removed within the predetermined time (NO in step S102), the image forming apparatus 1 does not shift to the sleep mode and resumes the interrupted job.

Figure 5:
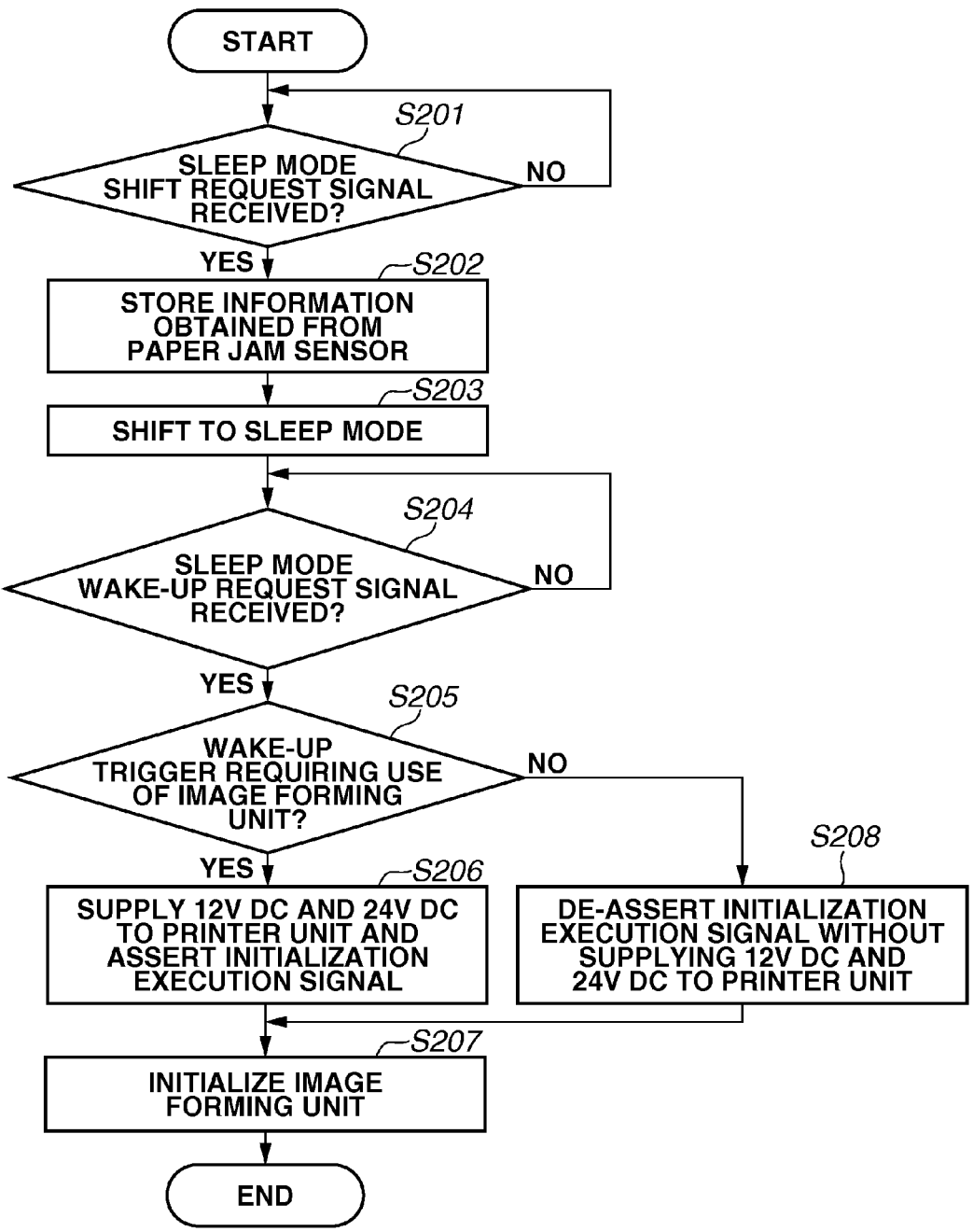
FIG. 5 is a flowchart illustrating a control method of the image forming apparatus.

FIG. 5 is a flowchart illustrating the processing performed in a normal state in which no paper jam occurs.

This flowchart illustrates a control method of the image forming apparatus 1 according to the present exemplary embodiment. More specifically, the flowchart illustrates an example of power supply control that is performed when no paper jam occurs in the image forming unit 22. Each of the steps is realized by executing the control program.

In step S201, the main control unit 31 determines whether a predetermined time has elapsed, or a sleep mode shift request signal has been received from the user pressing the key unit 42. If the predetermined time has elapsed or the sleep mode shift request signal has been received (YES in step S201), the processing proceeds to step S202. In step S202, the main control unit 31 stores in the storage unit of the sub control unit 32 the paper jam state information indicating that no paper jam occurs. In step S203, the image forming apparatus 1 shifts to the sleep mode.

Figure 6:
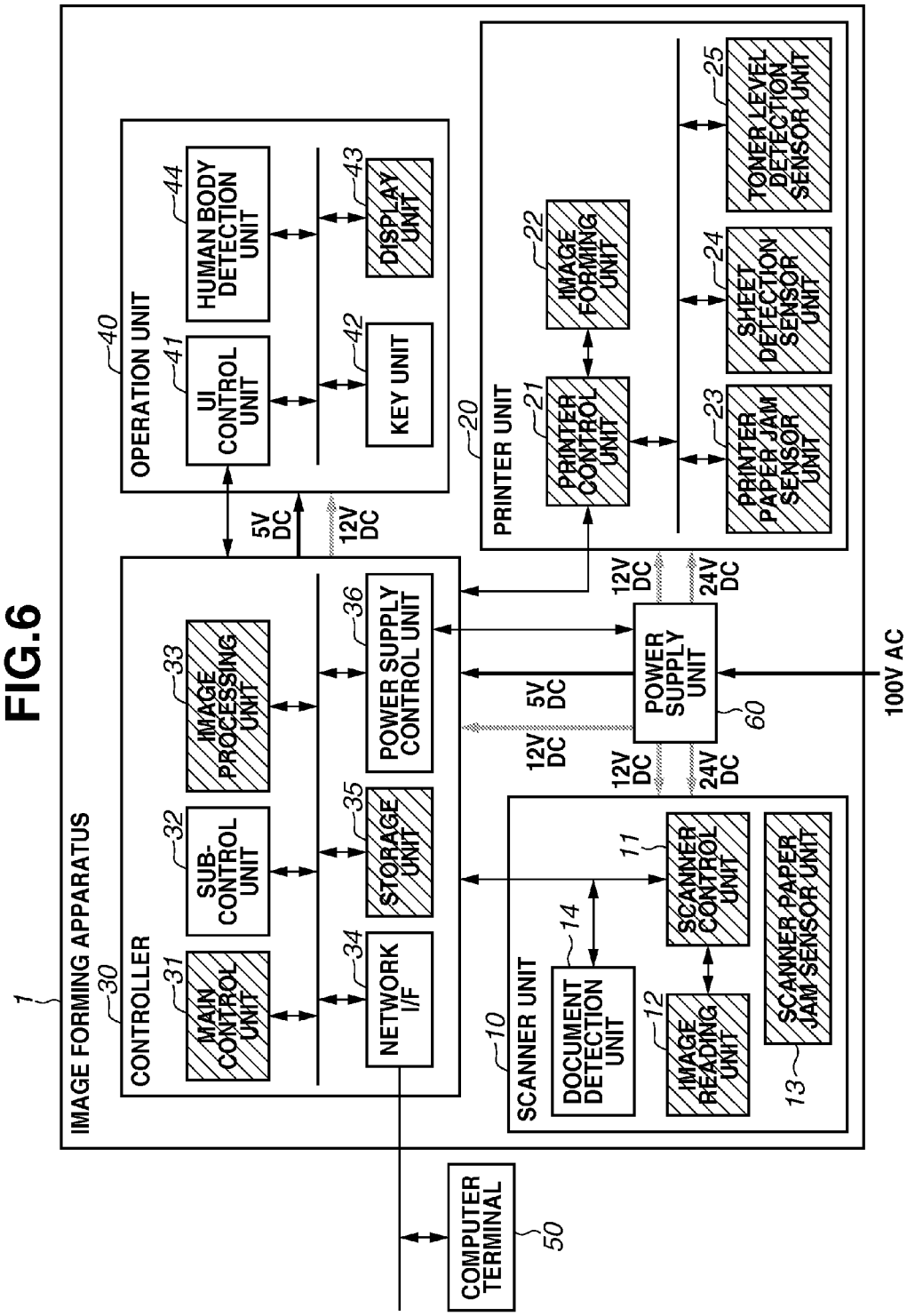
FIG. 6 is a block diagram illustrating the power supply system of the image forming apparatus.

FIG. 6 illustrates the power on/off state of each module in the image forming apparatus 1 when the image forming apparatus 1 has shifted to the sleep mode.

FIG. 6 is a block diagram illustrating the power supply system of the image forming apparatus 1 according to the present exemplary embodiment. As described above, when the image forming apparatus 1 shifts to the sleep mode, the power other than 5V DC, that is, 12V DC and 24V DC are stopped being supplied, and the portions indicated by hatch lines become a power off state.

In other words, while the image forming apparatus 1 is in the sleep mode, power is not supplied to the scanner unit 10 or the printer unit 20, and is supplied only to portions such as the sub control unit 32 in the controller 30 and the human body detection unit 44 in the operation unit 40.

Alternatively, a configuration may be used in which only the power supply to the operation unit 40 and the scanner unit 10 are stopped, or in which a plurality of sleep modes with different power consumption levels is provided so that the power supply to each unit is sequentially stopped after a predetermined time has elapsed. The state of shifting from a normal power consumption state to any lower power state is thus referred to as a sleep mode.

Returning to the flowchart illustrated in FIG. 3, in step S105, the sub control unit 32 stands by to receive a sleep mode wake-up request signal. According to the present exemplary embodiment, each of the modules such as the key unit 42 and the human body detection unit 44 transmits the sleep mode wake-up request signal to the sub control unit 32 in any of the following cases 1), 2), 3), and 4).

Specifically, the sleep mode wake-up request signal is transmitted when 1) the operator presses the key unit 42, 2) the human body detection unit 44 detects that the operator has come near the image forming apparatus 1, 3) the document detection unit 14 detects that a document has been placed, or 4) a print job has been received via the network I/F 34.

According to the present exemplary embodiment, only the above four cases are described as the cases where the image forming apparatus 1 wakes up from the sleep mode. However, the cases are not limited thereto. There are other various cases, including when a job to be performed by a facsimile (not illustrated) has been received, when a document has been placed on a manual feed tray (not illustrated), and when a short-range wireless identification (ID) card has been held over a card authentication unit (not illustrated).

When the sub control unit 32 has received the sleep mode wake-up request signal (YES in step S105), the processing proceeds to step S106. In step S106, the sub control unit 32 determines whether the trigger for the issuance of the sleep mode wake-up request signal requires the use of the image forming unit 22 (the portion in which the paper jam has occurred). More specifically, as illustrated in FIG. 7, only the unit(s) to be used is turned on among the image reading unit 12, the image forming unit 22, and the display unit 43, according to the sleep mode wake-up trigger. The sub control unit 32 determines whether the sleep mode wake-up trigger requires the use of the image forming unit 22, based on the jam state information stored before the image forming apparatus 1 shifts to the sleep mode.

Figure 8:
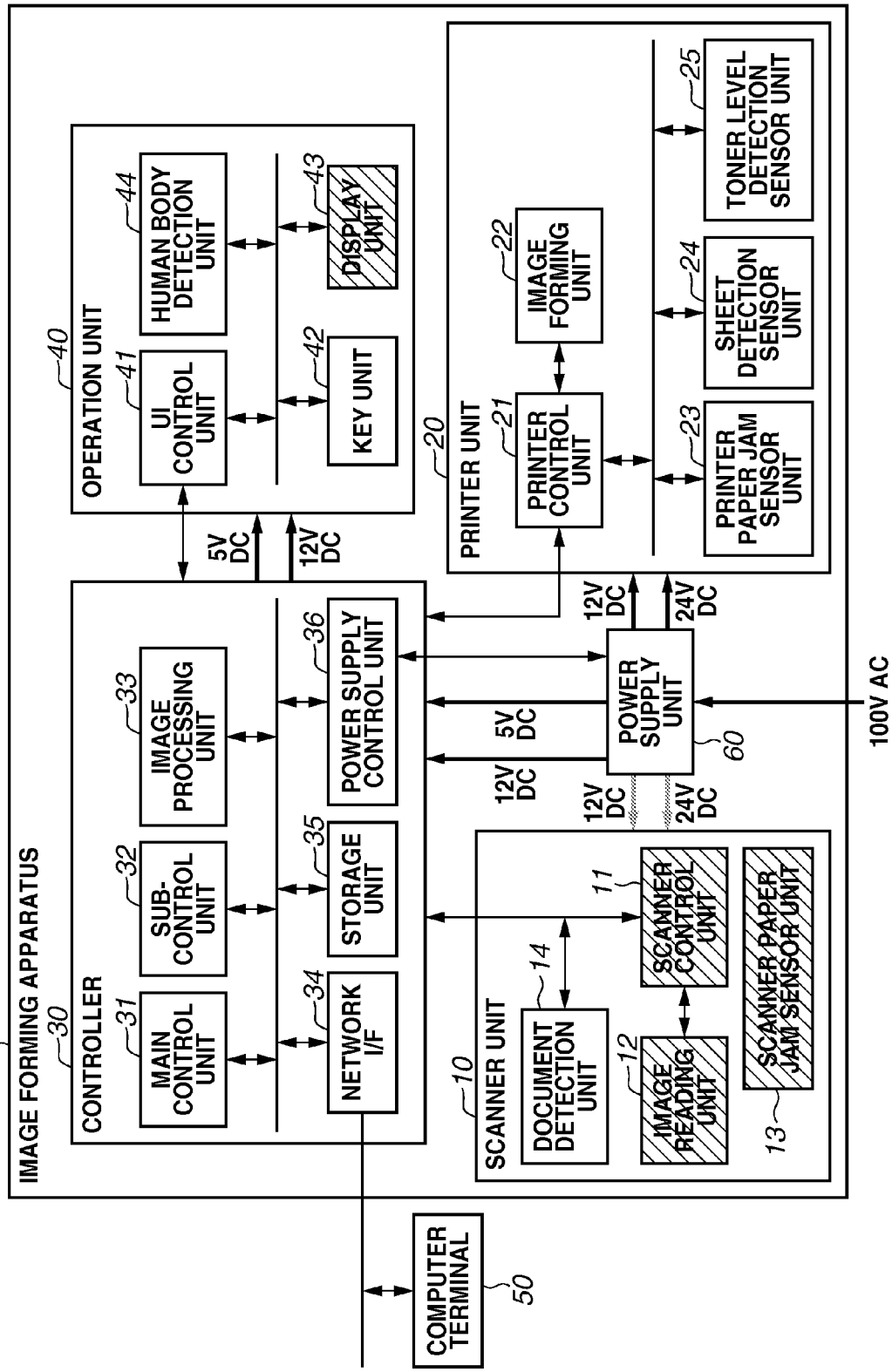
FIG. 8 is a block diagram illustrating the power supply system of the image forming apparatus.

If the wake-up trigger is reception of a print job, that is, the wake-up trigger requires the use of the image forming unit 22 (the portion in which the paper jam has occurred) (YES in step S106), the processing proceeds to step S107. In step S107, the sub control unit 32 controls the power supply control unit 36 to output 12V DC to the controller 30 and 12V DC and 24V DC to the printer unit 20 from the power supply unit 60, so as to supply power to the main control unit 31, the printer control unit 21, and the image forming unit 22 (refer to FIG. 8). Also at the same time, since the sub control unit 32 has received the sleep mode wake-up trigger that requires the use of the image forming unit 22, the sub control unit 32 asserts an initialization execution signal to the printer control unit 21.

The initialization execution signal is a signal output from the sub control unit 32 to each of the scanner control unit 11 and the printer control unit 21 when the image forming apparatus 1 is to wake up from the sleep mode. If the initialization execution signal is asserted high, each of the driving units is initialized, and if the signal is deasserted low, the driving units are not initialized, and only various sensors such as the paper jam sensors are switched on.

After the power is supplied to the main control unit 31, then in step S108, the main control unit 31 is activated and performs negotiations with the scanner control unit 11 and the printer control unit 21 to establish mutual communication. The printer control unit 21 initializes the image forming unit 22 in response to receiving an assertion of the initialization execution signal from the sub control unit 32. When initializing the image forming unit 22, the printer control unit 21 obtains the value of the printer paper jam sensor unit 23 and checks the paper jam state of the image forming unit 22.

Figure 9:
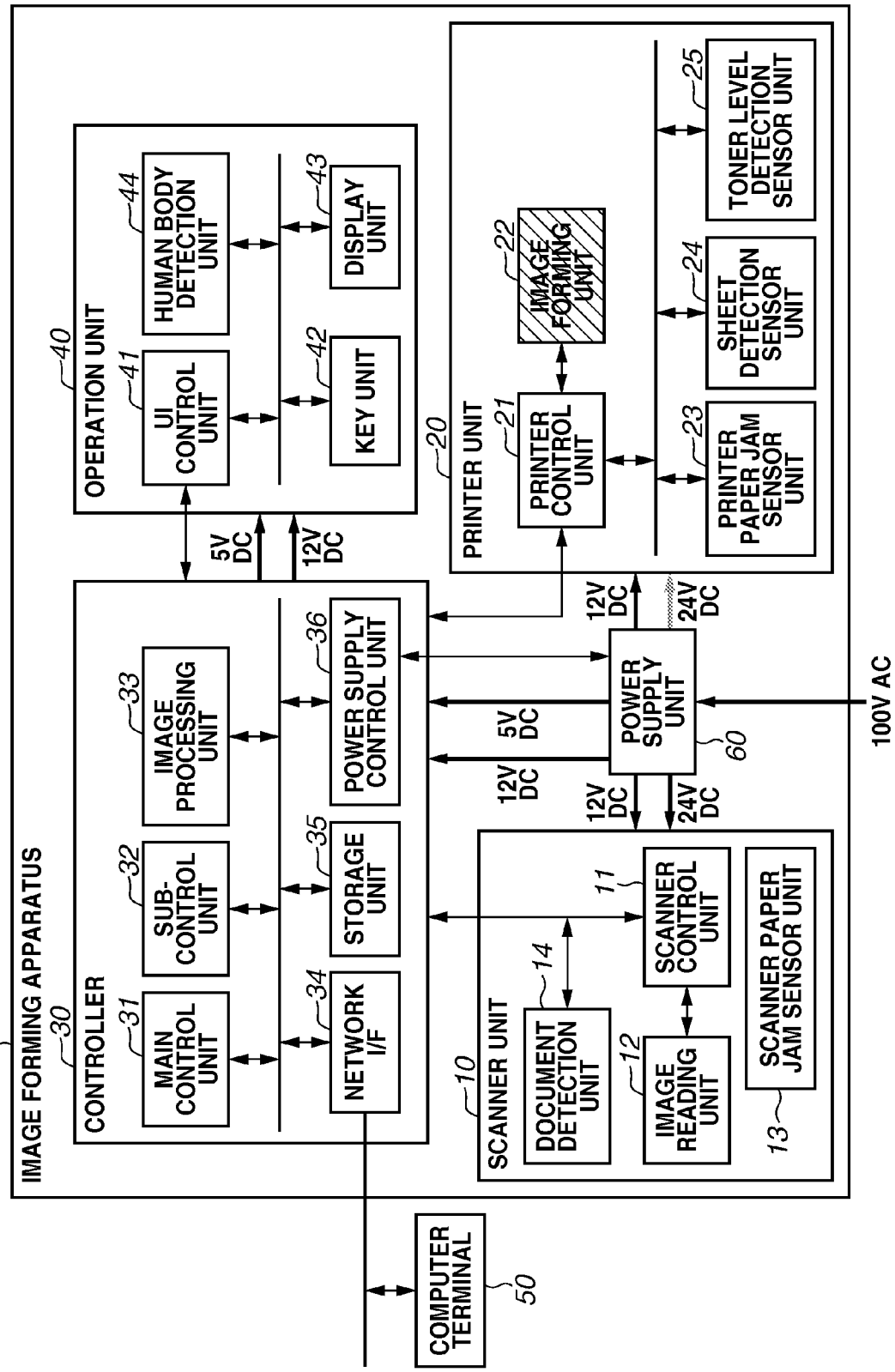
FIG. 9 is a block diagram illustrating the power supply system of the image forming apparatus.

If the wake-up trigger is document detection, that is, the wake-up trigger does not require the use of the image forming unit 22 (the portion in which the paper jam has occurred) (NO in step S106), the processing proceeds to step S109. In step S109, the sub control unit 32 controls the power supply control unit 36 to start supplying 12V DC to all the units and 24V DC to the scanner unit 10 from the power supply unit 60. In other words, the image forming apparatus 1 wakes up from the sleep mode without supplying 24V DC to the printer unit 20 (refer to FIG. 9).

Also at the same time, since the sub control unit 32 has received the sleep mode wake-up request that does not require the use of the image forming unit 22, the sub control unit 32 deasserts the initialization execution signal to the printer control unit 21. In step S110, the printer control unit 21, which receives a deassertion of the initialization execution signal from the sub control unit 32, does not initialize the image forming unit 22 and only turns on the sensor units such as the printer paper jam sensor unit 23 to check the paper jam state. As a result, a paper jam occurring in the image forming unit 22 can be detected even when 24V DC is not supplied to the printer unit 20 and the image forming unit 22 is not initialized.

Figure 10:
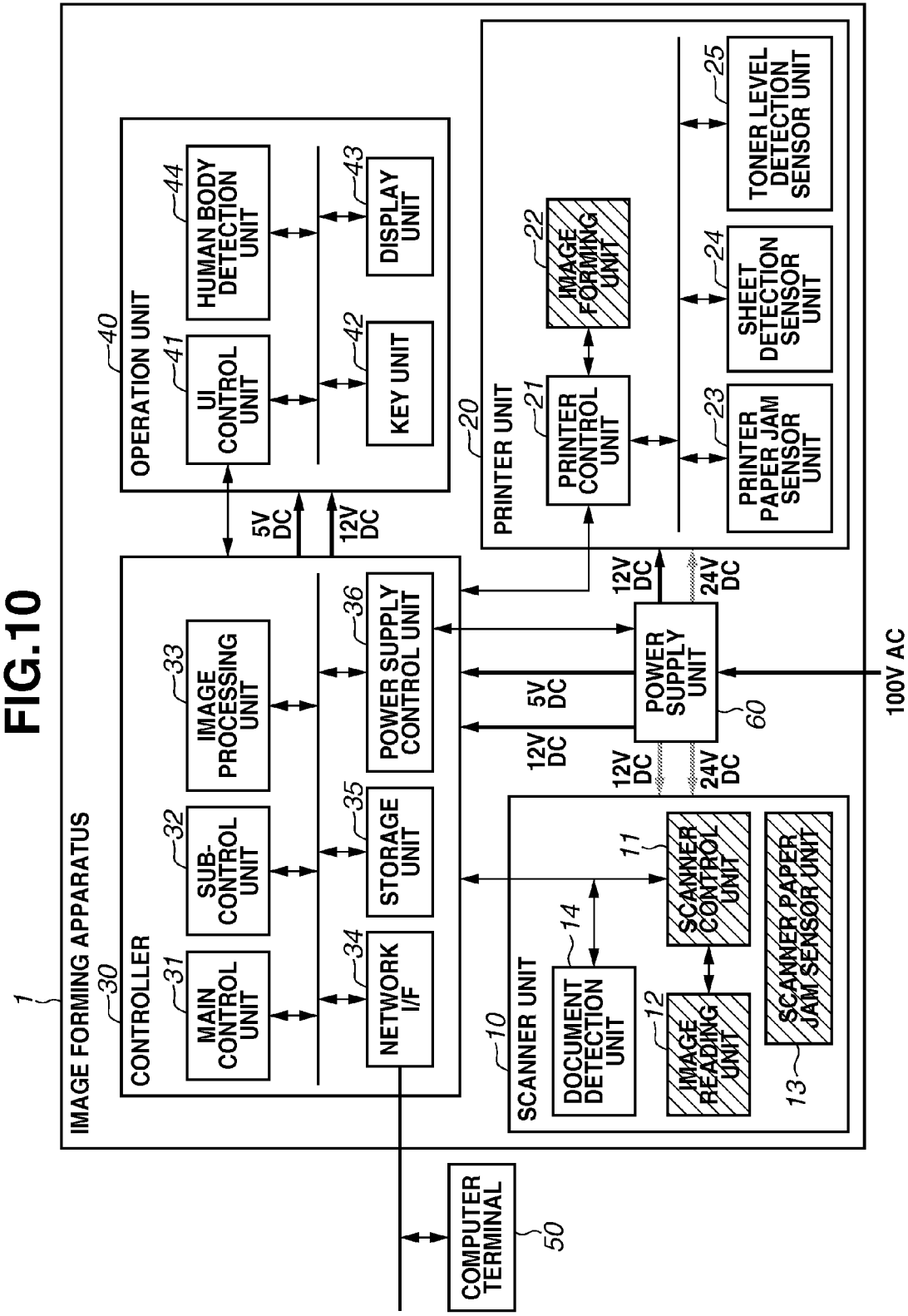
FIG. 10 is a block diagram illustrating the power supply system of the image forming apparatus.

If the wake-up trigger is, for example, human body detection, that is, the wake-up trigger does not require the use of either the image reading unit 12 or the image forming unit 22, in step S109, the sub control unit 32 controls the power supply control unit 36 to start supplying 12V DC to the controller 30 and the printer unit 20 from the power supply unit 60. In other words, the image forming apparatus 1 wakes up from the sleep mode without supplying 12V DC and 24V DC to the scanner unit 10 and 24V DC to the printer unit 20 (refer to FIG. 10).

Also at the same time, since the sub control unit 32 has received the sleep mode wake-up request that does not require the use of the image forming unit 22, the sub control unit 32 deasserts the initialization execution signal to the printer control unit 21. In step S110, the printer control unit 21, which receives a deassertion of the initialization execution signal from the sub control unit 32, does not initialize the image forming unit 22, and only turns on the sensor units such as the printer paper jam sensor unit 23 to check the paper jam state. Here, the processing in and after step S204 illustrated in FIG. 5 will be described below.

In the flowchart of FIG. 5 illustrating the normal state, in step S204, whether the sleep mode wake-up request signal has been received is determined. If it is determined that the request signal has been received (YES in step S204), the processing proceeds to step S205. In step S205, whether the wake-up trigger requires the use of the image forming unit 22 is determined. If it is determined that the wake-up trigger does not require the use of the image forming unit 22 (NO in step S205), the processing proceeds to step S208. In step S208, since the sub control unit 32 obtains, from the paper jam state information, the information indicating that no paper jam occurs, 12V DC and 24V DC are not supplied to the printer unit 20.

Figure 11:
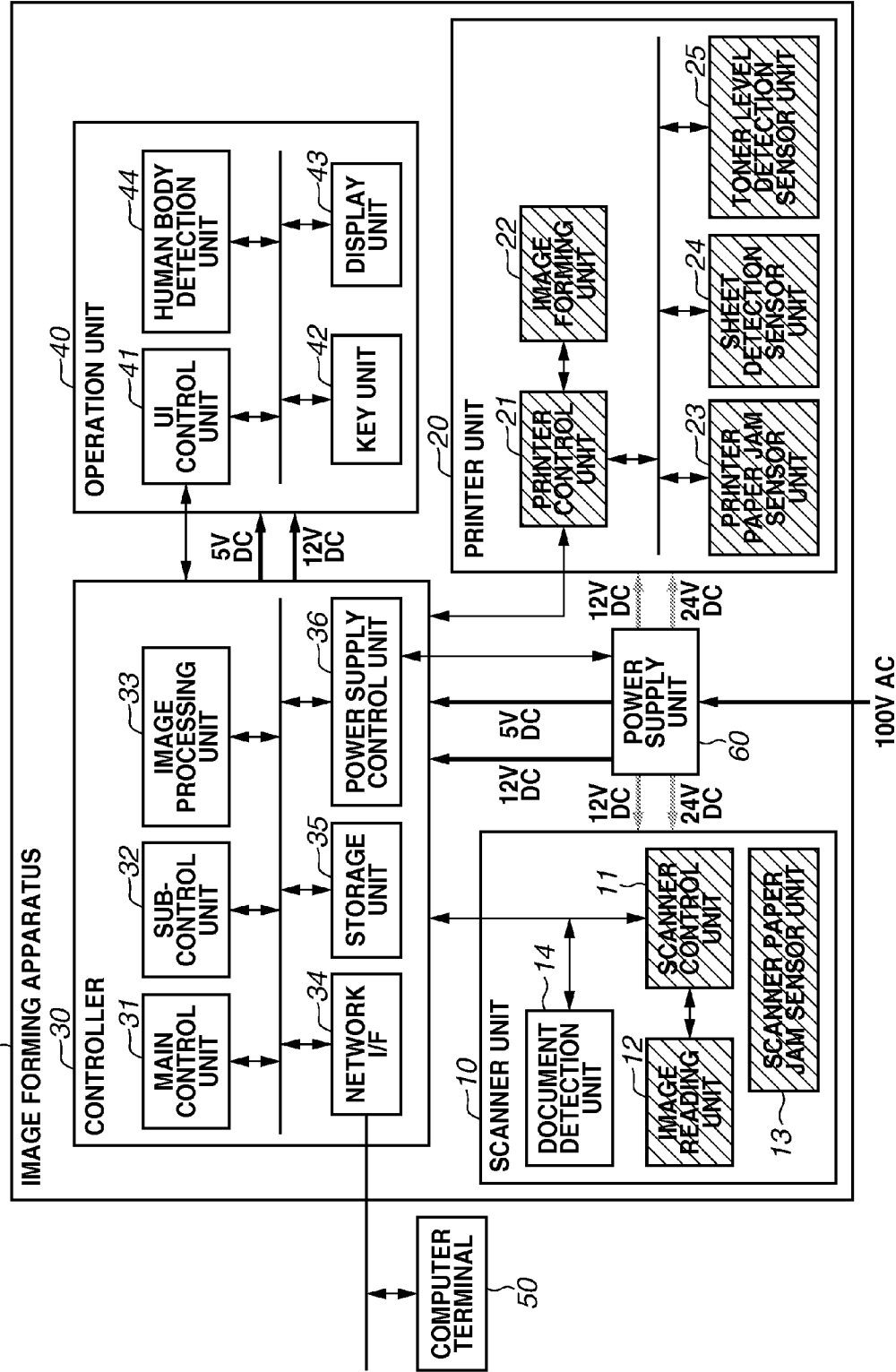
FIG. 11 is a block diagram illustrating the power supply system of the image forming apparatus.

Further, if the wake-up trigger does not require the use of the image reading unit 12, either, the sub control unit 32 only starts supplying 12V DC to the controller 30 and does not supply 12V DC or 24V DC to the scanner unit 10 (refer to FIG. 11). In other words, the scanner unit 10 and the printer unit 20 remain in the sleep mode, and only the controller 30 is in the activated state, so that the paper jam detection is not performed unless initialization is performed.

On the other hand, if it is determined that the wake-up trigger requires the use of the image forming unit 22 (YES in step S205), the processing proceeds to step S206. In step S206, 12V DC and 24V DC are supplied to the printer unit 20, and the initialization execution signal is asserted. In step S207, initialization of the image forming unit 22 is started.

Returning to FIG. 3, in step S111, the main control unit 31 determines whether the paper jam has been redetected in the image forming apparatus 1 since jam handling processing was not performed during the sleep mode. If the paper jam is redetected (YES in step S111), the processing proceeds to step S112. In step S112, the main control unit 31 performs display control on the display unit 43 so as to display a message indicating that the paper jam has occurred and warn the operator of the occurrence of the paper jam again. If the paper jam is not detected (NO in step S111), and if the image forming apparatus 1 has an interrupted job stored in the storage unit 35 in step S103, the main control unit 31 reads the job from the storage unit 35 and executes the job.

According to the above-described first exemplary embodiment, reduction of power consumption is prioritized. As a result, when the image forming apparatus 1 wakes up from the sleep mode, power is not supplied to a portion not required to be used by the wake-up trigger, and is supplied thereto after a job using this portion has been executed. Thus, in order to perform the operation of each driving unit (of the image reading unit 12 and the image forming unit 22), it is necessary to turn the power on, specify various settings of each control unit, and then complete the initialization. As a result, there is a delay in waking up from the sleep mode. To address this, according to a second exemplary embodiment, when the sleep mode wake-up trigger has been received, all the power is supplied unlike the first exemplary embodiment. Further, the control methods performed when the scanner control unit 11 and the printer control unit 21 have received the initialization execution signal are different from those of the first exemplary embodiment.

Figure 12:
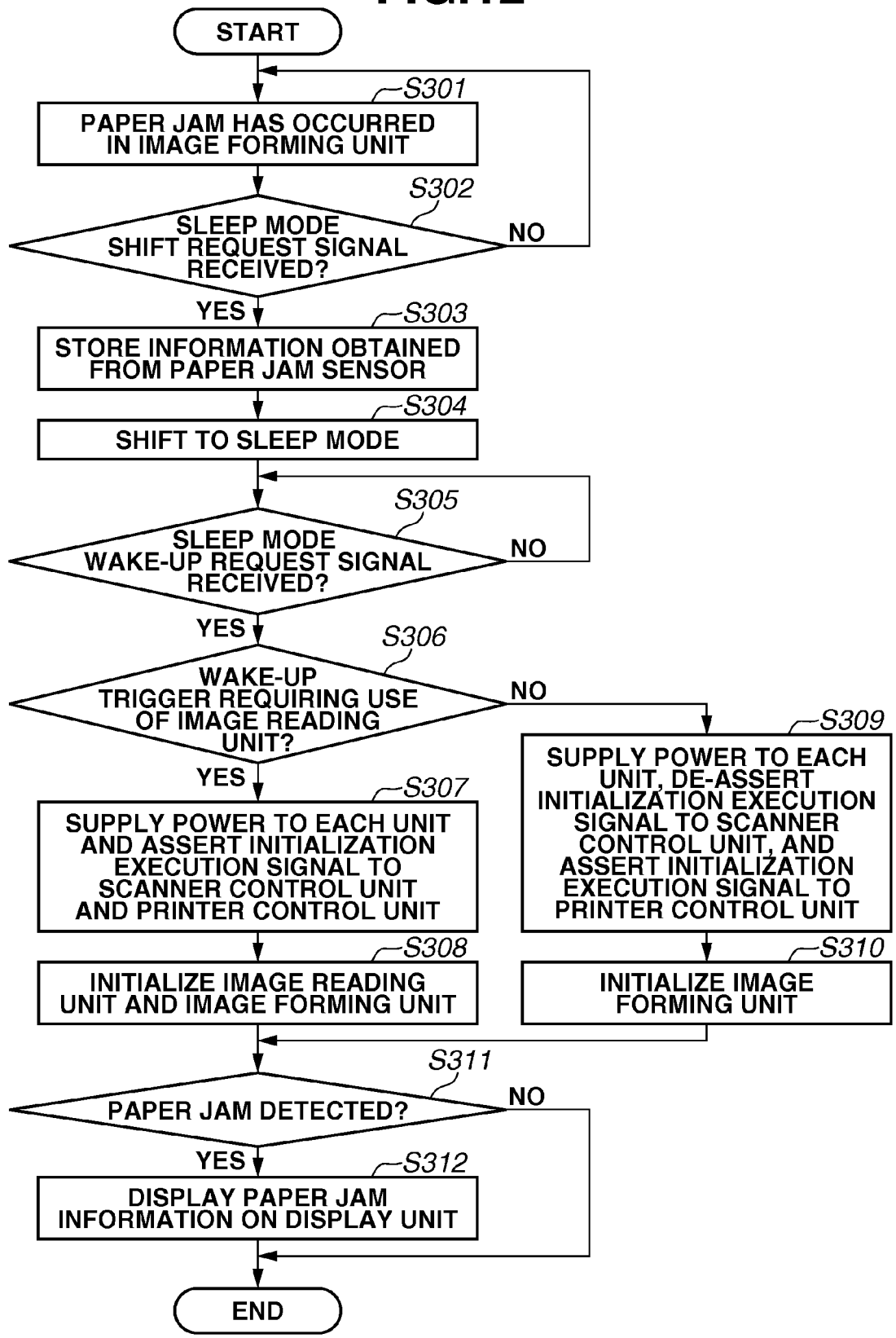
FIG. 12 is a flowchart illustrating a control method of the image forming apparatus.

FIG. 12 is a flowchart illustrating the control method of the image forming apparatus 1 according to the present exemplary embodiment. The flowchart illustrates an example of power supply control that is performed when a paper jam has occurred in the image forming unit 22. Each of the steps is realized by executing the control program. Since step S301 to step S305 and step S311 to step S312 are similar to step S101 to step S105 and step S111 to step S112 illustrated in FIG. 3, respectively and the description thereof will thus be omitted.

In step S306, the sub control unit 32 determines whether the wake-up trigger is document detection, that is, the wake-up trigger requires the use of the image reading unit 12. If the wake-up trigger requires the use of the image reading unit 12 (YES in step S306), the processing proceeds to step S307. In step S307, upon receiving the sleep mode wake-up request signal, the sub control unit 32 controls the power supply control unit 36 to output 12V DC and 24V DC to all the applicable units from the power supply unit 60, so as to supply power to each of the units in the image forming apparatus 1.

Also at the same time, since the sub control unit 32 has received the wake-up trigger which requires the use of the image reading unit 12, the sub control unit 32 asserts the initialization execution signal to the scanner control unit 11. The initialization execution signal is a signal output from the sub control unit 32 to each of the scanner control unit 11 and the printer control unit 21 when the image forming apparatus 1 is to wake up from the sleep mode. If the initialization execution signal is asserted high, each of the driving units is initialized, and if the signal is deasserted low, the driving units are maintained in an initialization ready state.

The sub control unit 32 further asserts the initialization execution signal to the printer control unit 21. The initialization does not normally need to be performed if the wake-up trigger is document detection and does not require the use of the image forming unit 22.

However, in the latest shift to the sleep mode, if the image forming apparatus 1 has shifted to the sleep mode while in the paper jam state, the sub control unit 32 always needs to assert the initialization execution signal to the printer control unit 21 to initialize the image forming unit 22. In step S308, when the main control unit 31 has been activated and the image forming apparatus 1 has woke up from the sleep mode, the scanner control unit 11 and the printer control unit 21 initialize the image reading unit 12 and the image forming unit 22, respectively, in response to receiving the initialization execution signals.

If the wake-up trigger is reception of a print job, that is, the wake-up trigger does not require the use of the image reading unit 12 (NO in step S306), the processing proceeds to step S309. In step S309, the sub control unit 32 controls the power supply control unit 36 to output 12V DC and 24V DC to all the applicable units from the power supply unit 60, so as to start supplying power to each of the units in the image forming apparatus 1, similarly to the processing in step S307.

Also at the same time, since the sub control unit 32 has received the wake-up trigger that does not require the use of the image reading unit 12, the sub control unit 32 deasserts the initialization execution signal to the scanner control unit 11 and asserts the signal to the printer control unit 21. Even if the wake-up trigger is, for example, human body detection and does not require the use of either the image reading unit 12 or the image forming unit 22, the sub control unit 32 always asserts the initialization execution signal to the printer control unit 21, so that processing similar to that in step S309 is performed.

In step S310, when the main control unit 31 has been activated and the image forming apparatus 1 has woke up from the sleep mode, the scanner control unit 11 does not initialize the image reading unit 12 and the printer control unit 21 initializes the image forming unit 22, in response to receiving the initialization execution signals.

Figure 13:
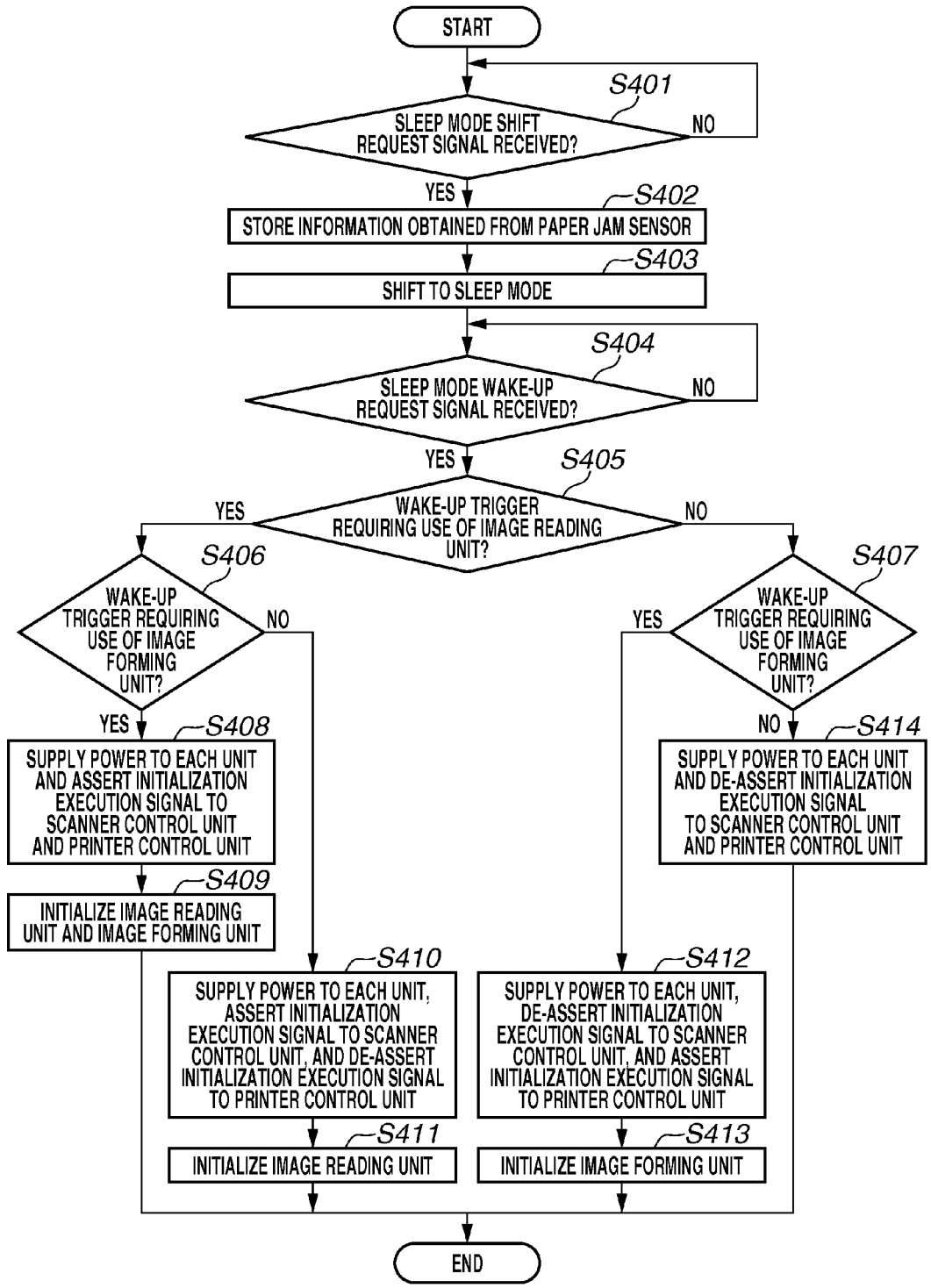
FIG. 13 is a flowchart illustrating a control method of the image forming apparatus.

FIG. 13 is a flowchart illustrating the control method of the image forming apparatus 1 according to the present exemplary embodiment. More specifically, the flowchart illustrates an example of power supply control that is performed in the normal state in which no paper jam occurs in the image forming unit 22. Each of the steps is realized by executing the control program. The normal state in which no paper jam occurs will be described below with reference to the flowchart illustrated in FIG. 13. Since step S401 to step S404 are similar to step S201 to step S204 of the flowchart illustrated in FIG. 5, the description thereof will thus be omitted.

In step S405, the sub control unit 32 determines whether the wake-up trigger requires the use of the image reading unit 12. In step S406 and step S407, the sub control unit 32 determines whether the wake-up trigger requires the use of the image forming unit 22. If the sub control unit 32 determines that the wake-up trigger requires the use of the image reading unit 12 (YES in step S405) and the image forming unit 22 (YES in step S406), the processing proceeds to step S408. In step S408, the sub control unit 32 controls the power supply control unit 36 to output 12V DC and 24V DC to all the applicable units from the power supply unit 60.

Also at the same time, the sub control unit 32 asserts the initialization execution signal to the scanner control unit 11 and the printer control unit 21. In step S409, when the main control unit 31 has been activated and the image forming apparatus 1 has woke up from the sleep mode, the scanner control unit 11 and the printer control unit 21 initialize the image reading unit 12 and the image forming unit 22, respectively, in response to receiving the initialization execution signals.

On the other hand, if the sub control unit 32 determines that the wake-up trigger requires the use of the image reading unit 12 (YES in step S405) and does not require the use of the image forming unit 22 (NO in step S406), the processing proceeds to step S410. In step S410, the sub control unit 32 controls the power supply control unit 36 to start outputting 12V DC and 24V DC to all the applicable units from the power supply unit 60. At the same time, the sub control unit 32 asserts the initialization execution signal to the scanner control unit 11 and deasserts the signal to the printer control unit 21. In step S411, when the main control unit 31 has been activated and the image forming apparatus 1 has woke up from the sleep mode, the scanner control unit 11 initializes the image reading unit 12 in response to receiving the initialization execution signal.

If the sub control unit 32 determines that the wake-up trigger does not require the use of the image reading unit 12 (NO in step S405) and requires the use of the image forming unit 22 (YES in step S407), the processing proceeds to step S412. In step S412, the sub control unit 32 controls the power supply control unit 36 to start outputting 12V DC and 24V DC to all the applicable units from the power supply unit 60. At the same time, the sub control unit 32 deasserts the initialization execution signal to the scanner control unit 11 and asserts the signal to the printer control unit 21. In step S413, when the main control unit 31 has been activated and the image forming apparatus 1 has woke up from the sleep mode, the printer control unit 21 initializes the image forming unit 22 in response to receiving the initialization execution signal.

If the sub control unit 32 determines that the wake-up trigger does not require the use of the image reading unit 12 (NO in step S405) and does not require the use of the image forming unit 22 (NO in step S407), the processing proceeds to step S414. In step S414, the sub control unit 32 controls the power supply control unit 36 to start outputting 12V DC and 24V DC to all the applicable units from the power supply unit 60. At the same time, the sub control unit 32 deasserts the initialization execution signals to the scanner control unit 11 and the printer control unit 21. When the main control unit 31 has been activated and the image forming apparatus 1 has woke up from the sleep mode, the scanner control unit 11 and the printer control unit 21 to which the initialization execution signal has been deasserted do not perform initialization. The processing thus ends. By performing the above-described processing in the normal state, initialization is appropriately performed only on the unit to be used for each wake-up trigger.

Figure 14:
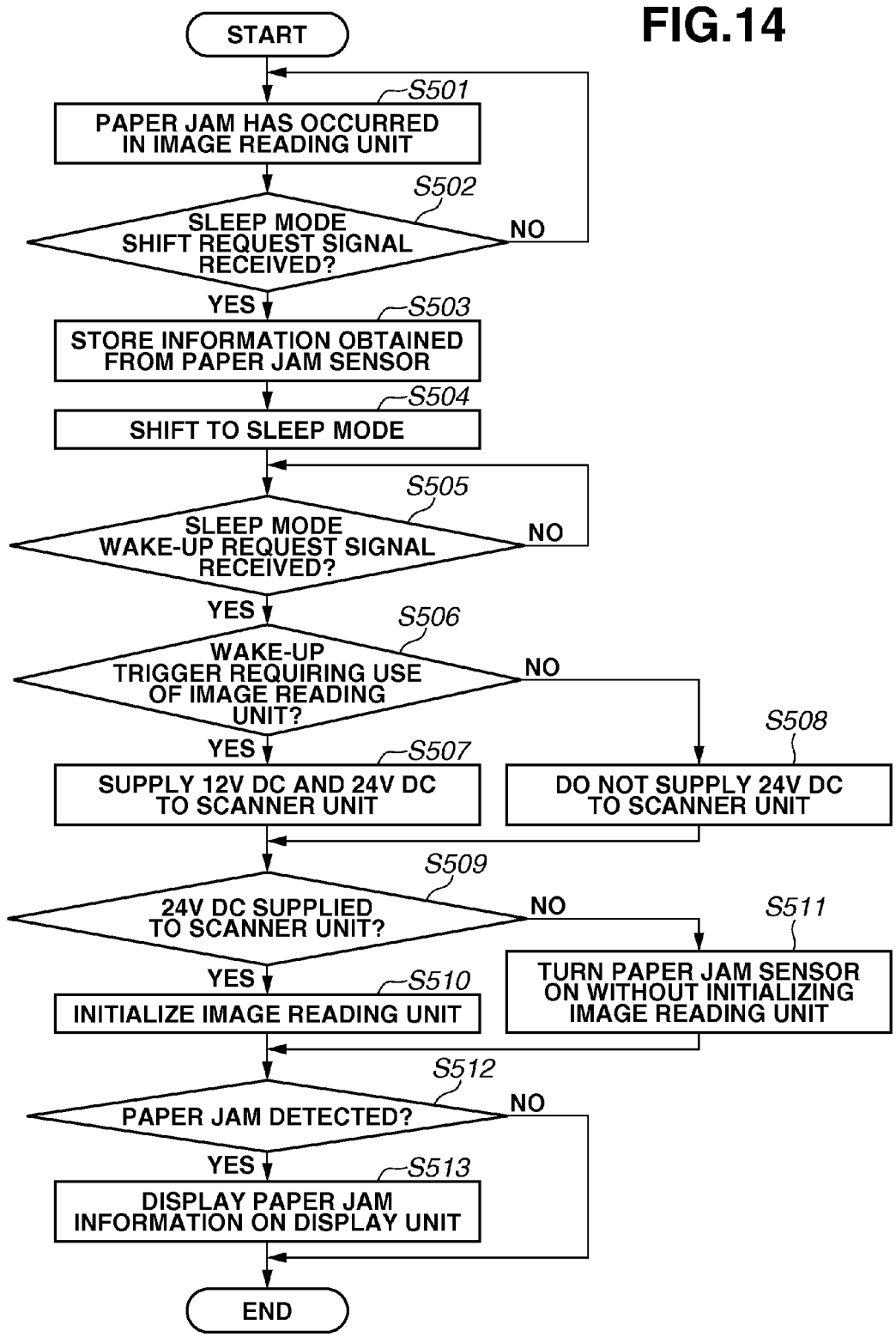
FIG. 14 is a flowchart illustrating a control method of the image forming apparatus.

FIG. 14 is a flowchart illustrating the control method of the image forming apparatus 1 according to a third exemplary embodiment. More specifically, the flowchart illustrates an example of power supply control that is performed when a paper jam has occurred in the image reading unit 12. According to the present exemplary embodiment, a paper jam has occurred in the image reading unit 12 of the scanner unit 10 and the initialization execution signal is not used, unlike the first exemplary embodiment. Each of the steps is realized by executing the control program.

In step S501, if a paper jam has occurred while the image reading unit 12 performs an image reading operation in the image forming apparatus 1, the scanner paper jam sensor unit 13 detects the paper jam. The scanner paper jam sensor unit 13 then transmits a paper jam occurrence signal and paper jam position information to the main control unit 31 via the scanner control unit 11. Upon receiving the paper jam occurrence signal, the main control unit 31 displays on the display unit 43 a warning message indicating that a paper jam has occurred, and stops the image reading operation.

Since the processing in step S502 to step S505 is similar to the processing in step S102 to step S105 illustrated in FIG. 3, the description thereof will be omitted.

Figure 15:
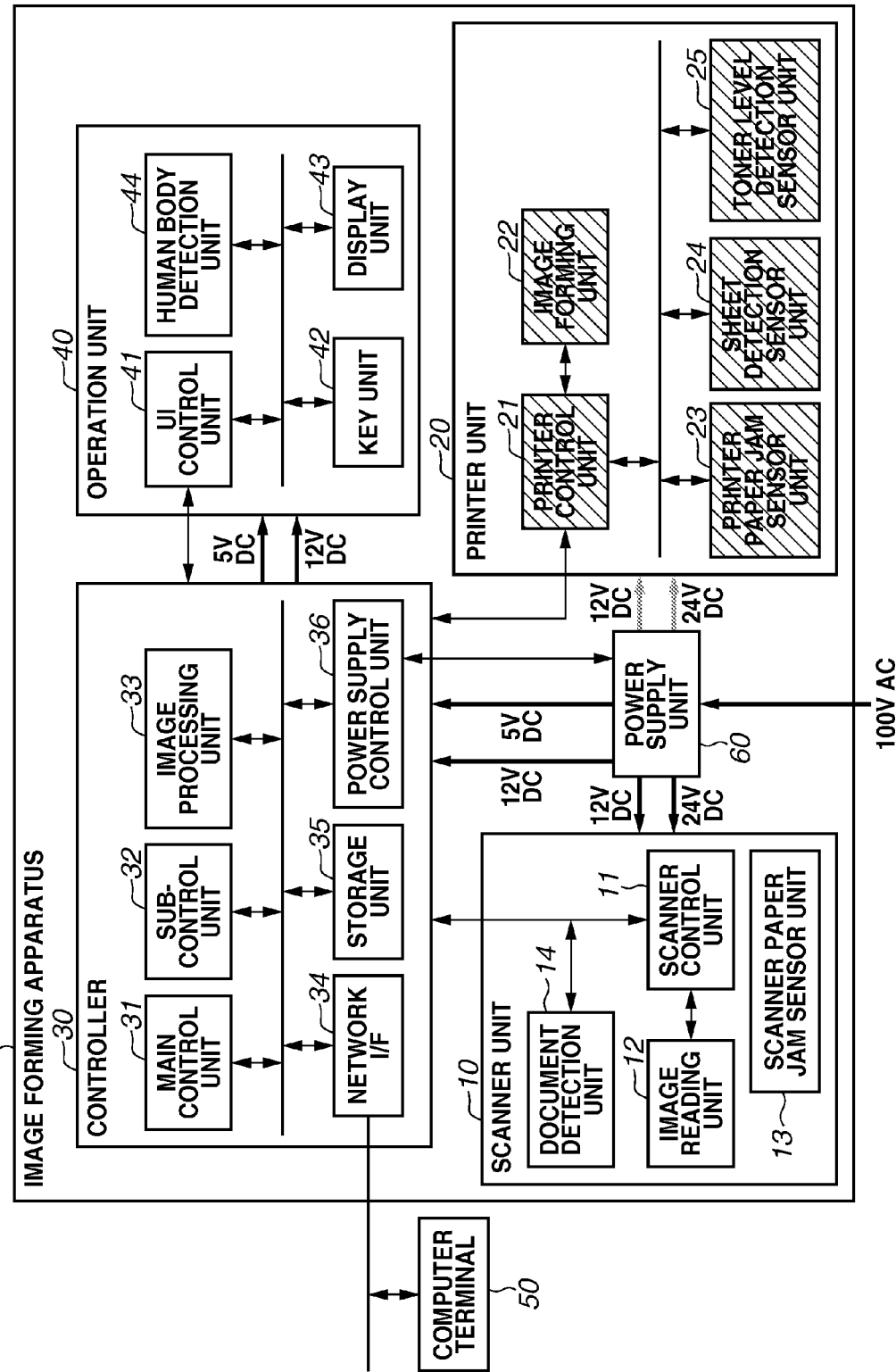
FIG. 15 is a block diagram illustrating the power supply system of the image forming apparatus.

In step S506, upon receiving a sleep mode wake-up request signal, the sub control unit 32 determines whether the trigger for the issuance of the sleep mode wake-up request signal requires the use of the image reading unit 12 (the portion in which the paper jam has occurred). If the wake-up trigger is document detection, that is, the wake-up trigger requires the use of the image reading unit 12 (the portion in which the paper jam has occurred) (YES in step S506), the processing proceeds to step S507. In step S507, the sub control unit 32 controls the power supply control unit 36 to output 12V DC to the controller 30 and 12V DC and 24V DC to the scanner unit 10 from the power supply unit 60, so as to supply power to the main control unit 31, the scanner control unit 11, and the image reading unit 12 (refer to FIG. 15).

Since the wake-up trigger is document detection and does not require the use of the printer unit 20, power is not supplied to the printer unit 20. In step S509, when the power has been supplied to the main control unit 31, the main control unit 31 is activated, and the scanner control unit 11 checks whether 24V DC is supplied to the scanner unit 10. If the power is supplied to the scanner unit 10 (YES in step S509), the processing proceeds to step S510. In step S510, the scanner control unit 11 initializes the image reading unit 12.

When initializing the image reading unit 12, the scanner control unit 11 obtains the value of the scanner paper jam sensor unit 13 to check the paper jam state of the image reading unit 12.

Figure 16:
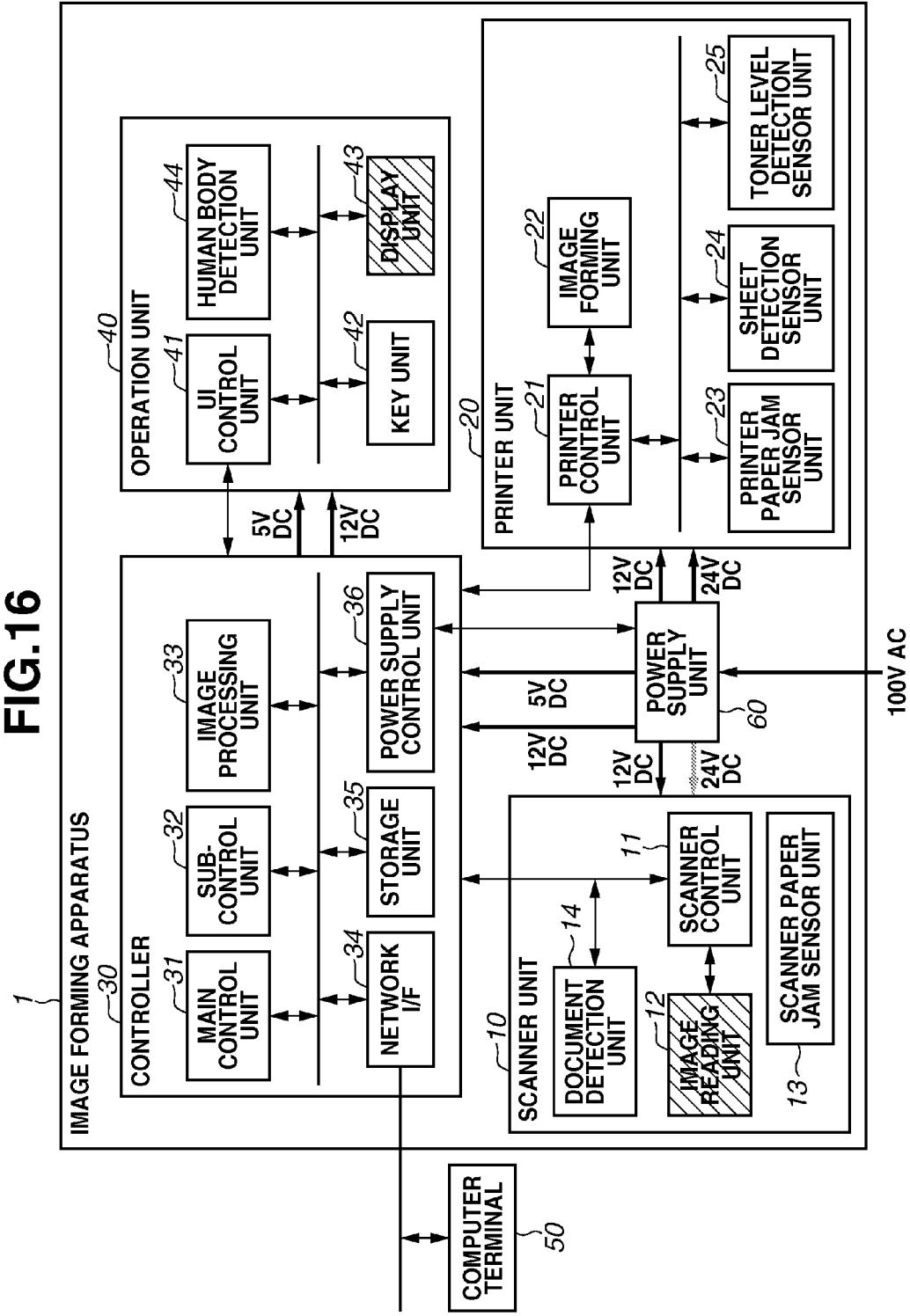
FIG. 16 is a block diagram illustrating the power supply system of the image forming apparatus.

If the wake-up trigger is reception of a print job, that is, the wake-up trigger does not require the use of the image reading unit 12 (the portion in which the paper jam has occurred) (NO in step S506), the processing proceeds to step S508. In step S508, the sub control unit 32 controls the power supply control unit 36 to start outputting 12V DC to all the units and 24V DC to the printer unit 20 from the power supply unit 60 (refer to FIG. 16). In other words, the sub control unit 32 does not supply 24V DC to the image reading unit 12. In step S509, the scanner control unit 11 checks whether 24V DC is supplied to the scanner unit 10. If the power is not supplied to the scanner unit 10 (NO in step S509), the processing proceeds to step S511. In step S511, the scanner control unit 11 does not initialize the image reading unit 12, and turns on the scanner paper jam sensor unit 13 to check the paper jam state of the image reading unit 12. As a result, the paper jam occurring in the image reading unit 12 can be detected even if 24V DC is not supplied to the scanner unit 10 and the image reading unit 12 is not initialized.

Figure 17:
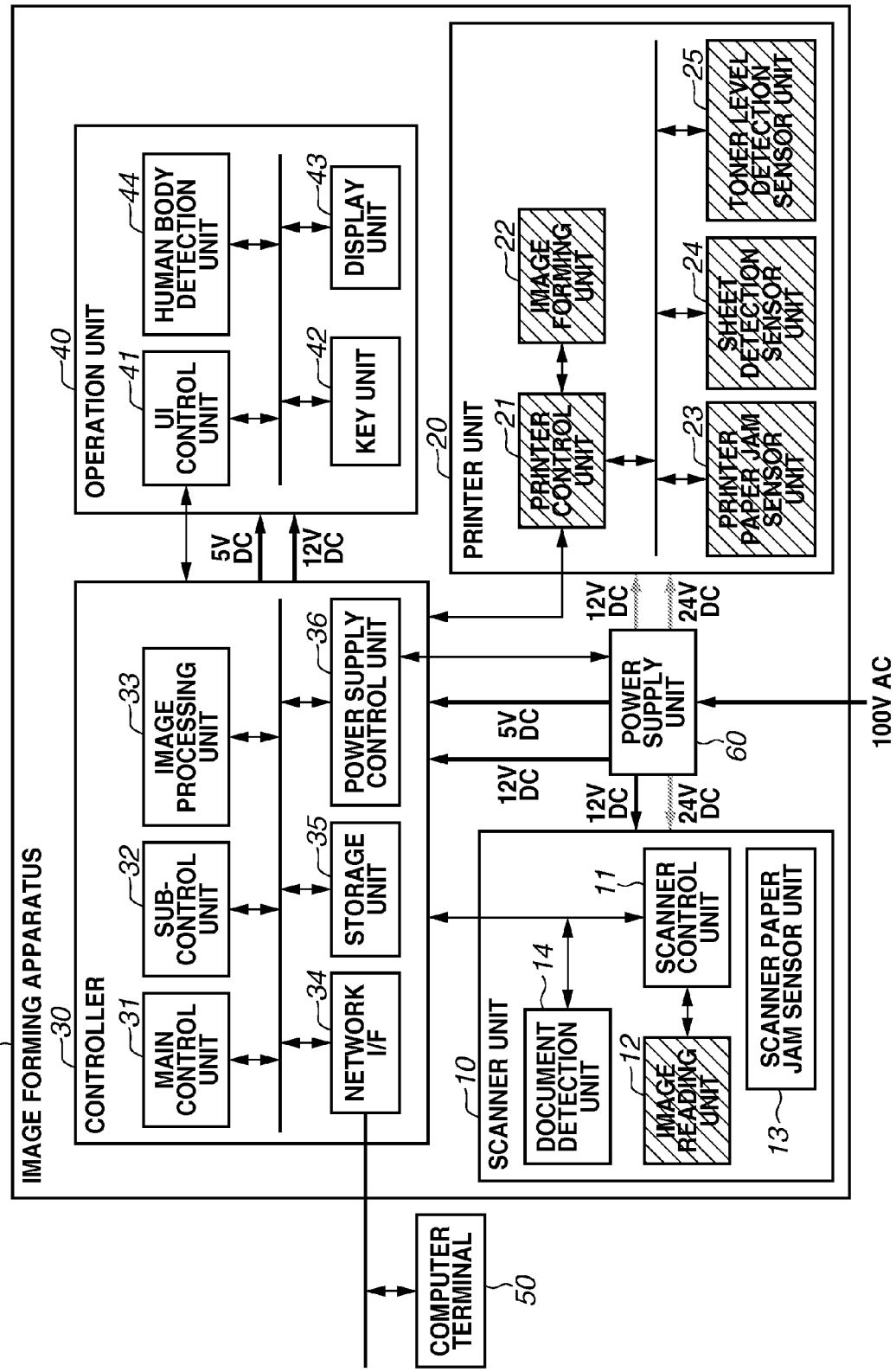
FIG. 17 is a block diagram illustrating the power supply system of the image forming apparatus.

If the wake-up trigger is human body detection and does not require the use of either the image reading unit 12 or the image forming unit 22, the sub control unit 32 controls the power supply control unit 36 to start supplying 12V DC to the controller 30 and the scanner unit 10 from the power supply unit 60. In other words, 24V DC is not supplied to the scanner unit 10, and 12V DC and 24V DC are not supplied to the printer unit 20 (refer to FIG. 17). In step S511, since 24V DC is not supplied to the scanner unit 10, the scanner control unit 11 does not initialize the image reading unit 12. The scanner control unit 11 only turns on a sensor unit such as the scanner paper jam sensor unit 13 and checks the paper jam state.

Since the processing in step S512 to step S513 is similar to the processing in step S111 to step S112 illustrated in FIG. 3, the description thereof will be omitted.

The control method of when the image forming apparatus 1 is in the normal state in which no paper jam occurs is different from the flowchart illustrated in FIG. 5 according to the first exemplary embodiment, only in that the determination of performing initialization is performed based on the power source (24V DC) instead of the initialization execution signal. The description thereof will thus be omitted.

According to the present exemplary embodiment, the case where a paper jam error has occurred has been described. However, other than this case, the processing similar to the above is also applicable to the case where an error such as running-out of paper or running-out of toner has occurred.

According to the above-described exemplary embodiments, in a case where the image forming apparatus wakes up from the sleep mode, whether the abnormal portion is to be used is determined based on the error information of when the apparatus shifts to the sleep mode, and the wake-up trigger. If it is determined that the abnormal portion is not to be used, no power is supplied to the driving unit of the portion in which an abnormality has been detected, and only an abnormality detection sensor is turned on. As a result, the occurrence of the error can be detected without initializing the driving unit of the abnormal portion. An unnecessary initialization operation can thus be omitted, and wasteful consumption of electrical current and driving noise can be reduced. Further, the occurrence of the error can be reported to the operator immediately after the wake-up from the sleep mode.

Each of the processing steps according to the exemplary embodiments may also be realized by executing software (a program) obtained via a network or various types of storage media on a processing device (e.g., a CPU or a processor) of a computer such as a personal computer (PC).

The above-described exemplary embodiments are not seen to be limiting, and various modifications (including organic combinations of each of the exemplary embodiments) can be made and are not excluded from the scope of the present disclosure.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-028392 filed Feb. 18, 2014, which is hereby incorporated by reference herein in its entirety.

What is claimed is:

1. An image forming apparatus that shifts to a power saving state, the image forming apparatus comprising:
   a detection unit configured to detect an error that occurs in a specific device of the image forming apparatus;
   a power saving unit configured to cause the image forming apparatus to shift to the power saving state in a state in which the error occurs in the specific device;
   a reception unit configured to receive a request to return the image forming apparatus from the power saving state;
   a determination unit configured to determine, based on the request received by the reception unit, a device to which power is to be supplied from among a plurality of devices of the image forming apparatus;
   a control unit configured to perform control such that, in a case where the reception unit receives the request in the state in which the error occurs in the specific device, power is supplied to the specific device in which the error is occurring even if the determination unit has not determined the specific device as the device to which power is to be supplied.

2. The image forming apparatus according to claim 1, wherein the specific device is an image forming unit configured to form an image on a sheet or an image reading unit configured to read an image of a document.

3. The image forming apparatus according to claim 1, wherein the detection unit detects a paper jam.

4. The image forming apparatus according to claim 1, wherein the detection unit detects an error related to a developer used in the image forming apparatus.

5. The image forming apparatus according to claim 1, wherein the control unit performs control such that, in a case where the reception unit receives the request in the state in which the error occurs in the specific device, power is supplied to the detection unit of the specific device in which the error is occurring even if the determination unit has not determined the specific device as the device to which power is to be supplied.

6. The image forming apparatus according to claim 1, wherein the control unit performs control such that power is supplied to the specific device in which the error is occurring but does not instruct execution of initialization processing of the specific device.

7. A method for controlling an image forming apparatus that shifts to a power saving state, the method comprising:
   detecting an error that occurs in a specific device of the image forming apparatus;
   causing the image forming apparatus to shift to the power saving state in a state in which the error occurs in the specific device;
   receiving a request to return the image forming apparatus from the power saving state;
   determining, based on the request received by the receiving, a device to which power is to be supplied from among a plurality of devices of the image forming apparatus;
   performing control such that, in a case where the receiving receives the request in the state in which the error occurs in the specific device, power is supplied to the specific device in which the error is occurring even if the determining has not determined the specific device as the device to which power is to be supplied.

8. A non-transitory computer-readable storage medium storing computer executable instructions that cause a computer to execute a method for controlling an image forming apparatus that shifts to a power saving state, the method comprising:
   detecting an error that occurs in a specific device of the image forming apparatus;
   causing the image forming apparatus to shift to the power saving state in a state in which the error occurs in the specific device;
   receiving a request to return the image forming apparatus from the power saving state;
   determining, based on the request received by the receiving, a device to which power is to be supplied from among a plurality of devices of the image forming apparatus;
   performing control such that, in a case where the receiving receives the request in the state in which the error occurs in the specific device, power is supplied to the specific device in which the error is occurring even if the determining has not determined the specific device as the device to which power is to be supplied.

9. An image forming apparatus that shifts to a power saving state, the image forming apparatus comprising:
   a detection unit configured to detect an error that occurs in a specific device of the image forming apparatus;
   a power saving unit configured to cause the image forming apparatus to shift to the power saving state in a state in which the error occurs in the specific device;
   a reception unit configured to receive a request to return the image forming apparatus from the power saving state;
   a determination unit configured to determine, based on the request received by the reception unit, a device which is to be initialized from among a plurality of devices of the image forming apparatus; and
   a control unit configured to perform control such that, in a case where the reception unit receives the request in the state in which the error occurs in the specific device, the specific device in which the error is occurring is to be initialized even if the determination unit has not determined the specific device as the device which is to be initialized.

10. The image forming apparatus according to claim 9, wherein the specific device is an image forming unit configured to form an image on a sheet or an image reading unit configured to read an image of a document.

11. The image forming apparatus according to claim 9, wherein the detection unit detects a paper jam.

12. The image forming apparatus according to claim 9, wherein the detection unit detects an error related to a developer used in the image forming apparatus.

* * * * *